United States Patent Office 3,255,135
Patented June 7, 1966

3,255,135
POLYMER DISPERSIONS USING HYDROCARBONS AND GRAFT COPOLYMER DISPERSING AGENTS
Claude J. Schmidle, Hudson, Ohio, and George L. Brown, Swampscott, Mass., assignors to Rohm & Haas Company, Philadelphia, Pa., a corporation of Delaware
No Drawing. Filed Feb. 5, 1965, Ser. No. 430,760
2 Claims. (Cl. 260—23)

This application is a continuation-in-part of our copending applications Serial No. 146,315, filed October 19, 1961, and Serial No. 758,892, filed September 4, 1958.

The present invention is concerned with the production of dispersions of polymers within organic liquid media in which the polymers are relatively insoluble and it is particularly concerned with polymer dispersions in hydrocarbon liquids. The invention is concerned with a polymerization technique in which the monomers are polymerized within organic liquids in which the polymer obtained is relatively insoluble, the polymerization being effected in the presence of a dispersing agent for maintaining the polymer produced as discrete particles in dispersed condition within the polymerization medium.

It is an object of the present invention to provide dispersions of synthetic addition polymers in organic liquid media using essentially hydrophobic dispersing agents for maintaining the insoluble polymer particles dispersed in the system in substantially stable form. It is another object of the invention to provide a polymerization system adapted to be varied widely in respect to viscosity characteristics merely by the choice of solvent or one or more components thereof. Another object of the present invention is to provide a polymer dispersion in organic liquids comprising discrete particles of the polymer which are insoluble in the liquid but dispersed therein by means of a substantially hydrophobic dispersing or stabilizing agent whereby films, coating, and impregnations obtained from the dispersions are of quite hydrophobic character and consequently resistant to moisture. Another object of the invention is to provide a polymerization system of essentially inert, non-aqueous or anhydrous type which, because of its non-aqueous quality, is adapted to the production of dispersed polymer systems in which the polymer is of crystalline character. Another object of the invention is to provide a polymerization system which is adapted to produce dispersions of discrete insoluble particles within organic solvents using monomers which because of their reactive character are incapable of polymerization in aqueous systems.

Another object of the invention is to provide a polymerization system in a non-aqueous medium or vehicle whereby, because of the non-aqueous character, a wider variety of polymerization techniques may be employed in the production of the polymer. Thus, in the polymerization systems of the present invention, the polymerization may be effected not only by the use of free-radical initiators but also by anionic and cationic techniques which latter two techniques cannot be performed in an aqueous system. Another object of the invention is to provide for the preparation of water-soluble polymers in an anhydrous medium. Other objects and advantages of the invention will be apparent from the description thereof hereinafter.

In accordance with the present invention, polymerizable and copolymerizable ethylenically unsaturated monomers having at least one group of the formula $H_2C=C<$ are polymerized to form addition polymers of either linear or cross-linked type in a hydrocarbon solvent medium containing a dispersing agent of polymeric character which is also of essentially hydrophobic nature. The dispersing agent or stabilizer may be formed in situ in the polymerization medium or it may be formed before it is introduced into the polymerization medium in which the main polymer is to be prepared.

Liquids that may be used in the polymerization system of the present invention include any liquid hydrocarbon whether formed of a single compound or of a mixture of compounds. The hydrocarbon may be of aliphatic character, either acrylic or alicyclic, aromatic, or naphthenic, or the polymerization medium may be made up of a mixture of these various types of hydrocarbons. Examples of individual hydrocarbons that may be employed include pentane, n-hexane, cyclohexane, n-heptane, n-octane, iso-octane, benzene, toluene, xylene (o-, m-, or p-xylene). Commercially-available hydrocarbon mixtures may be employed such as mineral spirits, gasoline, xylene mixtures, solvent naphthas of aromatic, aliphatic, or naphthenic character, alkyl benzenes in which the alkyl group or groups have from 1 to 4 carbon atoms, octane fractions which contain a mixture of octane isomers, and so on. Generally, it is preferred to employ a hydrocarbon liquid medium comprising at least 50% by weight of non-aromatic components, and especially those of aliphatic or paraffinic make-up. This preference has the advantage of lower cost and capacity to disperse a wider variety of polymers in the form of discrete particles.

It is essential that the hydrocarbon be of liquid character, but it may have a wide boiling range from a minimum of about —50° C. (in which case high pressures may be needed in the polymerization) to a maximum which may be as high as 300° C. For most purposes, the boiling point should be from about 0° C. up to about 200° C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° to 35° C. may be preferred. A similar boiling point range may be selected for pressure systems, as in aerosol sprays. On the other hand, where the coating and impregnating operation is to be carried out in the equipment provided with relatively high temperature drying ovens or rolls, the hydrocarbon system may have extremely high boiling points such as from 275° to 300° C. However, for most purposes, it is preferred to employ liquids boiling in the range from about 50° C. to about 235° C.

It is essential to select the hydrocarbon with the particular polymer to be prepared therein in mind. The hydrocarbon medium should be such that the polymer formed is relatively insoluble therein. This does not preclude the use of a hydrocarbon medium capable of swelling the polymer or of dissolving in the polymer up to 1% or even 50% on the weight of the polymer. A small proportion up to 10% of the polymer prepared may be of low molecular weight and soluble in the hydrocarbon medium. When the polymer prepared in the system has an appreciable solubility within the hydrocarbon medium, that portion which dissolves serves to thicken the system. By employing a composite hydrocarbon medium in which one of the components exerts a solvent action on the polymer and the other is substantially completely inert, controlled viscosity can be obtained merely by adjusting the proportions of the two components of the mixture. For example, a mixture of octane and toluene may be employed for the preparation of a dispersion of a polymer which has complete solubility in toluene and substantially no solubility in octane. By increasing or decreasing the proportion of toluene in the system, the viscosity in the system may be varied as desired from a very high value down to a very low value approaching that of the liquid used for the vehicle. In all of the systems of the present invention, the largest portion of the polymer, at least 90% by weight thereof, remains in undissolved condition dispersed in the system as discrete particles having sizes of 10 microns or less, and preferably from about 0.1 to 2 microns, by a dispersant more particularly described hereinafter.

The essentially hydrophobic dispersing agents employed in the systems of the present invention are of polymeric character. The polymeric dispersing agent contains in its molecule two essentially different portions or components, one of which is preferentially soluble in, or miscible with, the hydrocarbon medium at least to that degree which would result in the formation of a colloidal solution thereof, which portion may or may not be incompatible with the polymer to be dispersed which may be termed the main or primary polymer in the system. The other component or portion of the polymeric dispersing agent molecule is preferentially soluble in, or miscible with, the main polymer which portion may or may not be incompatible with the hydrocarbon medium. Thus, the first-mentioned portion has a stronger affinity for the hydrocarbon medium than the other whereas the second-mentioned portion has a stronger affinity for the main polymer. The second-mentioned component of the dispersant may be introduced into the polymeric dispersing agent molecule by a grafting operation wherein there is used a monomer which is of the same chemical constitution, or of sufficiently similar chemical constitution, as that of the monomer or monomers employed in the formation of the main polymer so that the portion of the dispersing agent molecule derived therefrom is compatible or miscible with the main or primary polymer.

The formation of the dispersing agent may be effected in situ simultaneously with the main polymerization. Alternatively, the dispersing agent may be formed by a separate preliminary graft polymerization and then introduced into the main polymerization system.

As the precursor for the polymeric dispersing agent there may be used a hydrocarbon-soluble polymeric material selected from the group consisting of oxidized unsaturated polyesters, e.g., diesters or triesters of aliphatic long-chain acids, such as oxidized vegetable and animal oils and especially oxidized drying oils. The molecular weight of the oxidized ester is preferably from about 800 to about 10,000 weight average.

Examples of aliphatic long-chain unsaturated acids from which the poly-esters (i.e., those having 10 to 24, preferably 12 to 18 carbon atoms) may be prepared include: linoleic acid, linolenic acid, eleostearic acid, licanic acid, soybean oil fatty acids, safflower oil fatty acids, linseed oil fatty acids, cottonseed oil fatty acids.

Examples of long-chain esters that may be modified by oxidation include the esters of any of the above unsaturated acids preferably those having 12 to 18 carbons in its acyl component with polyhydric aliphatic alcohols, such as di-esters with a glycol having 2 to 8 carbon atoms or with other aliphatic diols having 3 to 8 or more carbon atoms, and di-, or tri-esters of a triol, such as glycerol, including the naturally occurring glycerides of animal and vegetable oils having iodine numbers between about 100 to about 225. Specific examples include ethylene glycol di-linoleate, butylene glycol-1,3-dilinolenate, hexylene glycol-1,6-dieleostearate, the dilinoleate of ethylene glycol, the dilinolenate of diethylene glycol, the di-linoleates of octamethylene glycol, the dilinoleate of 2,6-octane-diol, and so forth.

The oils that may be used in making the modified polymeric material may be any of the following: sardine oils, cottonseed oil, soybean oil, poppy seed oil, peanut oil, cashew nut oil, linseed oil, corn oil, sesame oil, castor oil, dehydrated castor oil, rapeseed oil, grapeseed oil, perilla oil, hempseed oil, tung oil, oiticica oil, tall oil, menhaden oil, codfish oil, swordfish oil, shark oil, whale oil.

Any of these unsaturated esters or oils or mixtures thereof may be oxidized by "blowing" them with air or oxygen at elevated temperatures such as from 70 to 250° C. Blown linseed oil and blown dehydrated castor oil are particularly valuable.

In general, the molecular weight of the dispersing agent may be of a wide range, but preferably it is from one-tenth to ten times that of the main polymer.

The monomers which are adapted to be converted into dispersed polymers by the polymerization system of the present invention may be selected from a wide variety such as the vinyl esters of fatty acids having from 1 to 18 carbon atoms including vinyl acetate, vinyl propionate, vinyl butyrate, vinyl laurate, vinyl oleate, and vinyl stearate. Esters of acrylic acid or of methacrylic acid with alcohols having from 1 to 18 carbon atoms may likewise by employed. Examples include methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylates. Acrylonitrile, methacrylonitrile, acrylamide, methacrylamide, styrene, α-methyl styrene, vinyl toluenes, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate, hydroxyalkyl acrylates or methacrylates such as β-hydroxyethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene may also be used as the monomers for making the main polymer. Copolymers of the various monomers just mentioned may be prepared by the polymerization system of the present invention and copolymers of any one or more of the above-mentioned monomers with up to 50% by weight of maleic anhydride may be formed by the system of the present invention.

To illustrate the need for consideration of the particular monomer in selecting the hydrocarbon medium, when the polymer is formed largely of styrene, the hydrocarbon selected should be of acyclic aliphatic character in which the polymer is insoluble since hydrocarbon media having a large aromatic component would dissolve the polymer.

In the polymerization system of the present invention, several variations in procedure may be employed. The most readily adaptable system which is also highly convenient to use is that of free-radical type polymerization. This type of polymerization employs a free-radical catalyst of azo or peroxygen type. Examples include benzoyl peroxide, lauroyl peroxide, acetyl peroxide cumene hydroperoxide, paramenthane hydroperoxide, azodiisobutyronitrile, dimethyl azodiisobutyrate, and so on. Any of the free-radical type catalysts which are soluble in the monomer or the hydrocarbon may be employed. Free-radical catalysts which are activated by means of amines such as triethylenetetramine and those activated by various salts such as cobalt naphthenate are suitable. In general, any free radical catalyst that can be used for bulk or solution polymerization of the monomers herein enumerated can be employed in the present invention. The proportion of catalyst may be from 0.1% to 3% of the weight of monomer or monomers. The amount employed may depend on the method of addition and the molecular weight desired in the dispersed polymer. Of course, the catalyst may be added all at once or in portions at periodic intervals.

A. *Free radical system with preliminary precursor activation step*

The simplest procedure involving the free-radical type of polymerization is to dissolve the dispersing agent precursor in the liquid hydrocarbon which is to serve as the medium of polymerization. The proportion of the precursor may be from about 2 to 20% of the weight of polymer to be dispersed by the dispersing agent. In fact, the proportion of dispersing agent may even be much higher such as up to 30% or more in the systems of the present invention since the dispersing agent is of water-insensitive character and films or coatings obtained from the polymer dispersions prepared therewith are not susceptible to deterioration or disintegration by moisture or high humidity. To the solution of the precursor in the hydrocarbon medium, the catalyst or initiator is added. The proportion of initiator may be from 0.1 to 5% by weight of the precursor. After addition of the initiator to the solution of precursor, the mixture is heated to temperatures of 65° to 120° C. or more (keeping below the decomposition temperature of the precursor). The time for this preliminary heating may vary depending upon the particular precursor, the time being longer at lower temperatures and shorter at the higher temperatures. For example, the time may vary from 5 minutes up to an hour or more. When the precursor is of a character which is capable of cross-linking on heating, the temperature should be kept below the temperature which would effect cross-linking.

After active sites are formed on the precursor in this manner, the monomer or monomers to be polymerized to form the main polymer are introduced along with additional catalyst if needed. The mixture is heated with continued agitation to a suitable polymerization temperature which depends upon the particular initiator and the particular monomer. In some cases instead of heating, the system may simply be allowed to react at room temperature or it may be cooled particularly when an activated peroxide initiator is used. With such activated catalysts, temperatures of −5° to −10° C. may be employed. In other systems, the temperatures may be raised to as much as 50° C. or as high as 120° C. or higher depending upon the vapor pressure of the hydrocarbons and monomers and available pressure equipment to avoid loss by volatilization. Generally, the temperature is controlled to avoid too rapid a polymerization and to avoid such a high temperature as to preclude the grafting of a portion of the monomer upon the dispersing agent precursor. In general, the polymerization is carried to as high a conversion as is practical in a suitable period of time. As much as 94 to 98% conversion can be obtained in a period of one-half to 48 hours depending upon the particular monomers and initiators and proportions. For most practical operations, 2 to 10 hours may be employed. The proportion of monomers added to the precursor solution may vary over a wide range so as to provide a main polymer concentration from about 1% to about 55% or more in the polymer dispersion prepared.

If desired, the monomer may be added continuously or at intervals over a period of fifteen minutes to several hours. When the main or dispersed polymer is formed by copolymerization of two or more monomers, one or more may be added at the initial stage and this may be followed by the addition of the other or others subsequently, the latter addition being made either continuously or at periodic time intervals. Again, when a mixture of monomers is used, an initial mixture thereof may be richer in one or more of the components thereof as compared to another monomer or other monomers therein and subsequently added mixtures may be progressively changed to provide the other monomer or monomers in relatively larger proportions. Subsequently added monomer may contain supplemental amounts of catalyst or it may be added simultaneously with separately introduced supplemental amounts of catalyst.

After completion of the polymerization, the final concentration of the polymer dispersion may be varied by dilution with additional liquid hydrocarbon or by the removal, such as by distillation, of a portion of the hydrocarbon medium during which a portion or all of any residual monomer may also be removed. In this manner polymer dispersions containing as low as 1% concentration or less or as high as 50 to 65% may be obtained. For most purposes, concentrations of 10 to 45% of dispersed polymer (excluding dispersing agent) are generally employed.

B. *Free-radical system without preliminary precursor activation step*

A variation of the procedure just described involves the dissolution of the polymeric precursor, the monomer to be polymerized to form the main polymer, and the free-radical initiator in the hydrocarbon medium. After preparing this mixture, it may be heated (or cooled) with agitation under conditions generally consistent with those suggested in the preceding description to effect polymerization. The proportion of initiator may be from 0.01 to 5% by weight of the total weight of monomer and precursor and the concentration of monomer may be such as to result in a main polymer concentration of 1 to 60% or more.

In either of the two procedures of preparing the polymer dispersions just described (under headings A and B), there may be present an excess of the precursor over that which is copolymerized with a portion of the monomer by grafting so that in effect, the resulting polymer dispersion also contains an amount of precursor which is not modified by grafting with the added monomer. The result is a blended polymer composition of its own distinctive character. This is particularly advantageous in the preparation of a pigmented polymer dispersion intended to be employed as a paint, wherein the precursor employed is an oxidized oil such as oxidized linseed oil. As much as 50 to 95% of the precursor may thus be unmodified by grafting and form a substantial component in the final polymeric system.

C. *Free-radical preliminary formation of dispersing agent*

Another modification involves the heating of the solution of the precursor containing the free-radical initiator as in the first procedure (A) described, but adding only a limited proportion of the monomer as the second step after the formation of active sites on the precursor. Thus, only 10 to 150% by weight, based on the weight of the precursor, of the monomer or monomer mixture is added. At this point, the system is heated with continued agitation to effect copolymerization and grafting of the monomer or monomers on the precursor. After substantial grafting has been effected, the remainder of the monomer is added and polymerization is continued as before to form the main polymer. In this case, if an activated peroxide is employed as initiator, the polymerization in both the grafting and final polymerization stages may be effected at low temperatures of −5° to −10° C. as before.

D. *Cationic systems*

Instead of employing a free-radical system, a cationic polymerization system or technique may be employed. This uses the conventional Friedel-Crafts or acidic catalysts such as aluminum chloride, stannic chloride, boron fluoride and its complexes such as the etherates, titanium tetrachloride, aluminum bromide, sulfuric acid, and certain activated clays. The proportion of catalyst employed in this system may be from 0.1 to 1% on the monomer in the final dispersion prepared. In this system, the precursor may first be introduced into the hydrocarbon medium with the Friedel-Crafts catalyst, the monomers are introduced into the solution, and the polymerization is carried out to form a polymer from the monomer. This system is particularly adapted to the polymerization of the lower alkyl vinyl ethers such as the methyl, ethyl, propyl, isopropyl, n-butyl, sec-butyl, isobutyl, and t-butyl vinyl ethers, α-methyl styrene, and alkoxy-α-methyl styrenes, such as paramethoxy-α-methyl styrene, and other monomers having an electron donor group on the double bond.

The cationic system may be varied by introducing into the hydrocarbon medium not only the acidic catalyst but also the monomers and a grafted precursor such as that prepared with a free-radical initiator and 10 to 150% of the monomer on the precursor as described hereinabove in procedure C. In general, this is the preferred manner of preparing a polymer dispersion when using a cationic polymerization system for forming the main polymer dispersed therein.

E. Anionic systems

The same procedures as described hereinabove (A, B, and C) for making the polymer dispersions by a free-radical type of polymerization may be employed with an anionic technique. In this technique, the catalysts are of anionic type including such materials as butyllithium, butylmagnesium bromide, phenylmagnesium bromide, triphenylmethylsodium, sodium naphthalene, 9-fluoronyllithium, and dipotassiumstilbene. The proportion of this catalyst is from 0.1 to 5% on the weight of the monomers. This system is particularly adapted to the polymerization of such monomers as vinylidene cyanid, esters of α-cyano acrylic acid, α-trifluoro methyl acrylonitrile, N,N - dialkyl - substituted acrylamides and -methacrylamides, itaconic acid esters, acrylic acid esters and methacrylic acid esters, acrylonitrile, methacrylonitrile, and ethylene, particularly using the anionic Ziegler catalysts. The anionic system may also be employed only for the polymerization of the main polymer in which event the precursor graft or dispersing agent may be prepared by the free-radical system using 10 to 150% of the monomer on the precursor as above in procedure C and the main polymer then prepared in a dispersion of the monomer or monomers with the dispersing agent and the anionic catalyst in the hydrocarbon medium.

As pointed out hereinabove, the products are dispersions in liquid hydrocarbon media containing discrete particles of the main polymer dispersed by a polymeric dispersing agent. Generally the polymer dispersions of the present invention may have concentrations varying from 1 to 55% or higher solids. These compositions, as pointed out hereinabove, are dilutable by the addition of a suitable liquid hydrocarbon mentioned hereinabove to any desired concentration for application for the coating and impregnation of various substrates as well as for the formation of free films by casting techniques. Thus, the polymer dispersions may be employed for the impregnation and coating of textile fabrics, paper, paperboards, leathers, wood, metals, ceramics, concrete, bricks, stones, plaster, vinyl wall tile and flooring tile, linoleum, asphalt tile, and asbestos cement products including siding and shingles. As pointed out hereinabove, the coatings and impregnations thereby obtained are insensitive to water by virtue of the fact that there is present no hydrophilic emulsifier or dispersing agent. The viscosity of the dispersion is adapted to be easily controlled merely by the addition of a solvent or swelling agent simply by adding a hydrocarbon which has no solvent or swelling action on the dispersed polymer.

The polymer dispersions of the present invention are adapted to be modified by the incorporation of drying oils, pigments, fillers, dyes, as well as plasticizers, and polymeric or resinous materials which are soluble in the hydrocarbon liquid vehicle including fatty acid-modified shellac, gums, natural resins, silicone oils, e.g., polysiloxanes, epoxidized fatty oils, coal tar, cumarone-indene resins, asphalts, bitumens, epoxy resins, organic solvent-soluble alkylated methylolated aminoplast resins including the condensates of formaldehyde with urea, melamine, thiourea, benzoguanamine, ethyleneurea, alkylated with an alcohol having 2 to 6 carbon atoms such as n-butanol. Among other materials that can be incorporated are various waxes, the alkyds including oil-modified alkyd resins, organic solvent-soluble vinyl and acrylic resins with or without plasticizers including plastisols obtained from polyvinylchloride, or copolymers of vinyl chloride and plasticizers therefor.

To assist those skilled in the art to practice the present invention, the following modes of operation are suggested by way of illustration, parts and percentages being by weight and the temperatures in ° C. unless otherwise specifically noted.

(1) Air is bubbled through 500 parts of refined linseed oil heated at 120° C. with vigorous stirring for two hours. The temperature is raised to 127° to 136° C. for an additional five hours. The Gardner-Holdt viscosity of the oil rises from A to Z–3. Five parts of this oxidized oil is dissolved in 75 parts of commercial octane. To this solution 0.1 part benzoyl peroxide, 22.5 parts of methyl methacrylate, and 22.5 parts of ethyl acrylate are added and the mixture is stirred and heated at reflux temperature for four hours. The milky "latex" obtained has a solids content of about 38% consisting essentially of 85% of a 50:50 copolymer of methyl methacrylate and ethyl acrylate in the form of undissolved particles ranging in size from about 0.1 to 9.5 microns and 15% of dissolved graft copolymer of the methyl methacrylate and ethyl acrylate on the oxidized linseed oil. A mixture of 5 parts butoxyethyl acetate and 5 parts of commercial octane is added to the polymer dispersion which is then formed into a continuous self-supporting film of water-resistant and grease-resistant character by coating plates of glass and stripping the dried coatings therefrom.

(2) To a solution of 10 parts of oxidized linseed oil (prepared as in Example 1) in 150 parts of commercial heptane there is added 80 parts of methyl methacrylate, 10 parts of acrylic anhydride and 0.4 part of lauroyl peroxide. The mixture is stirred and heated at reflux temperature for four hours. The dispersion has a solids content of about 37%. The undissolved methyl methacrylate/acrylic anhydride copolymer has particle sizes ranging from 0.3 to 3.5 microns. A mixture of 5 parts of butoxyethyl acetate and 5 parts of commercial octane is added to the polymer dispersion which is then formed into a continuous self-supporting film of water-resistant and grease-resistant character by coating plates of glass and stripping the dried coatings therefrom.

(3) (a) Air is bubbled through 500 parts of dehydrated castor oil at a temperature of 123° C. with vigorous agitation for two hours. Then the temperature is raised to 130° C. and the passage of air therethrough is continued until the mass reaches a Gardner-Holdt viscosity of Z–4.

(b) Twenty parts of the oxidized dehydrated caster oil obtained in part (a) is dissolved in 150 parts of commercial octane. To this solution, there are added 35 parts methyl methacrylate, 28 parts ethyl acrylate, 35 parts styrene, 2 parts methacrylic acid and 1.5 parts lauroyl peroxide. The mixture is stirred and heated at reflux temperature for five hours. The white milky dispersion obtained has a solids content of 42% consisting essentially of 90% of a copolymer of about 35% methyl methacrylate, 28% ethyl acrylate, 35% styrene and 2% methacrylic acid in the form of undissolved particles ranging in size from 0.05 to 4 microns and about 10% of dissolved graft copolymer of methyl methacrylate, ethyl acrylate, and styrene on the oxidized castor oil.

The dispersion is applied to panels of bare cold-rolled steel and to the coated side of steel panels carying a commercial oil-modified alkyd/melamine-formaldehyde/polyepoxide resin primer the coated panels then being air-dried and heated for a half-hour at 110° C. The clear, glossy protective coatings thereby produced on the bare steel show fair adhesion and on the primed panels, excellent adhesion.

(c) The procedure of part (b) is repeated except the oxidized dehydrated castor oil solution is replaced with a solution in 400 parts of commercial octane, of 80 parts of an oxidized tung oil having a G-H viscosity of Z-3. The dispersion obtained contains a substantial amount of oxidized tung oil unmodified by grafting as well as a grafted component serving to disperse the insoluble copolymer. The dispersion is pigmented with titanium dioxide in the weight ratio of pigment to binder of 60:100 and zinc octoate (0.5 part per 100 of binder) is added to serve as a drier. Panels of primed and unprimed cold-rolled steel are coated, dried, and baked as in part (b) yielding glossy white adherent coatings.

(4) (a) 500 parts of glyceryl dilinoleate is oxidized by passing air therethrough at 110° C. for three hours followed by passing air therethrough at 128° C. until a G-H viscosity of Y is reached.

(b) 15 parts of the oxidized glyceryl dilinoleate obtained in (a) is dissolved in 160 parts of commercial heptane. To this solution is added gradually a mixture of 30 parts acrylonitrile, 35 parts methyl methacrylate, 30 parts butyl acrylate, 5 parts acrylamide, and 0.8 part benzoyl peroxide. The mixture is stirred and heated at reflux for six hours. The milky white dispersion has a solids content of about 40 to 41% consisting essentially of about 85% of a copolymer of acrylonitrile, methyl methacrylate, butyl acrylate and acrylamide in the form of undissolved particles ranging in size from about 0.1 to 9 microns and about 15% of dissolved graft copolymer of these monomers on the oxidized glyceryl dilinoleate.

(5) (a) Part (a) of (4) is repeated with a 50:50 weight ratio mixture of linolenic and linoleic diglycerides.

(b) 15 parts of the oxidized oil mixture obtained in (a) is dissolved in 160 parts of commercial octane. To this solution is added gradually a mixture of 60 parts methyl methacrylate, 35 parts ethyl acrylate, 5 parts of N-butoxymethyl-acrylamide, and 0.8 parts lauroyl peroxide. The mixture is stirred and heated at reflux for five hours. A white milky dispersion is obtained. It is coated on bare and primed panels of cold-rolled steel, the coated panels being dried and baked for a half-hour at 150° C. Clear, glossy, adherent, and solvent-resistant protective coatings were obtained.

(6) (a) Part (a) of (4) is repeated substituting butylene glycol-1,3-dilinolenate.

(b) Part (b) of (5) is repeated using 15 parts of the diester obtained in part (a) hereof and replacing the monomer mixture with a mixture of 50 parts butyl methacrylate, 43 parts methyl acrylate, 2 parts of N-methylolacrylamide, 5 parts acrylamide, and 1 part lauroyl peroxide.

Protective coatings having good water-resistance, solvent resistance, adhesion, and durability are obtained when the resulting dispersion is applied to substrates as in (5) (b) above.

(7) (a) Air is bubbled through 500 parts of butylene glycol ester of soybean fatty acids at a temperature of 123° C. with vigorous agitation for two hours. Then the temperature is raised to 130° C. and the passage of air therethrough is continued until the mass reaches a Gardner-Holdt viscosity of Z-4.

(b) The procedure of (5) (b) above is repeated except that the oxidized oil mixture there used is replaced with the oxidized ester of part (a) hereof. Similar protective coatings are obtained.

(8) (a) Air is bubbled through 500 parts of trilinolein (glycerol trilinoleate) at a temperature of 123° C. with vigorous agitation for two hours. Then the temperature is raised to 130° C. and the passage of air therethrough is continued until the mass reaches a Gardner-Holdt viscosity of Z-4.

(b) The procedure of (5) (b) above is repeated except that the oxidized oil mixture there used is replaced with the oxidized ester of part (a) hereof. Similar protective coatings are obtained.

(9) (a) Air is bubbled through 500 parts of glycerol eleostearate at a temperature of 123° C. with vigorous agitation for two hours. Then the temperature is raised to 130° C. and the passage of air therethrough is continued until the mass reaches a Gardner-Holdt viscosity of Z-4.

(b) The procedure of (5) (b) above is repeated except that the oxidized oil mixture there used is replaced with the oxidized ester of part (a) hereof. Similar protective coatings are obtained.

(10) (a) Air is bubbled through 500 parts of safflower oil at a temperature of 123° C. with vigorous agitation for two hours. Then the temperature is raised to 130° C. and the passage of air therethrough is continued until the mass reaches a Gardner-Holdt viscosity of Z-4.

(b) The procedure of (5) (b) above is repeated except that the oxidized oil mixture there used is replaced with the oxidized oil of part (a) hereof. Similar protective coatings are obtained.

We claim:

1. A process for producing a dispersion of a polymer in a substantially anhydrous essentially inert liquid medium which comprises initially dissolving a polymer selected from oxidized vegetable oils and oxidized animal oils in an anhydrous liquid medium consisting essentially of at least one member selected from aliphatic, aromatic, and naphthenic hydrocarbons, the liquid medium containing about 0.1 to 5% by weight, based on the weight of the dissolved polymer, of an addition-polymerization catalyst, the pressure being in the range of normal atmospheric pressure to superatmospheric pressure to assure that at the temperture of the polymerization, it occurs in the anhydrous medium while in liquid state, adding polymerizable ethylenically unsaturated monomeric molecules having a group of the formula $H_2C=C<$ and comprising at least one alkyl acrylate or alkyl methacrylate in which the alkyl group has 1 to 18 carbon atoms to the polymer solution and effecting polymerization at a temperature in a range from about $-10°$ C. to about 120° C. to produce a stable dispersion of solid polymer particles insoluble in the medium and having sizes in the range of about 0.05 to 10 microns, the weight of monomeric molecules added being sufficient to produce a concentration, in the final dispersion, of at least about 1% to about 55% by weight of the aforesaid dispersed insoluble solid polymer particles, the amount of the aforementioned polymer initially dissolved in the hydrocarbon medium being about 2 to 20% by weight, based on the weight of the polymer to be dispersed.

2. As a composition of matter, a polymer dispersion in a liquid medium obtained by the process of claim 1.

References Cited by the Examiner
UNITED STATES PATENTS

| | | | |
|---|---|---|---|
| 2,556,336 | 6/1951 | Nye | 260—23 |
| 2,926,153 | 2/1960 | Christenson | 260—23 |
| 3,095,388 | 6/1963 | Osmond et al. | 260—33.6 |

LEON J. BERCOVITZ, *Primary Examiner.*

RALPH A. WHITE, *Assistant Examiner.*